United States Patent [19]

LeBlanc et al.

[11] Patent Number: 5,182,326

[45] Date of Patent: Jan. 26, 1993

[54] ROSIN AND FATTY ACID BASED PIGMENT GRINDING AIDS FOR WATER-BASED INK FORMULATIONS

[75] Inventors: Paul J. LeBlanc, Jacksonville, Fla.; Peter Schilling, Charleston, S.C.

[73] Assignee: Westvaco Corporation, New York, N.Y.

[21] Appl. No.: 681,916

[22] Filed: Apr. 8, 1991

[51] Int. Cl.$^5$ .............................................. C08L 77/00
[52] U.S. Cl. .................................... 524/514; 524/500; 524/607; 524/600
[58] Field of Search ............... 524/270, 549, 500, 514, 524/600, 607

[56] References Cited

U.S. PATENT DOCUMENTS

| | | | |
|---|---|---|---|
| 3,412,056 | 11/1968 | Crawford et al. | 524/600 |
| 4,074,988 | 2/1978 | Eilerman et al. | 524/514 X |
| 4,381,367 | 4/1983 | von Bonin et al. | 524/549 |
| 4,478,642 | 10/1984 | Schilling et al. | 106/277 |
| 4,494,992 | 1/1985 | Schilling et al. | 106/277 |
| 4,547,224 | 10/1985 | Schilling | 106/273 |
| 4,561,901 | 12/1985 | Schilling | 106/277 |
| 4,870,119 | 9/1989 | Yee et al. | 524/607 X |
| 4,973,617 | 11/1990 | Incontro et al. | 524/607 X |
| 4,980,088 | 12/1990 | Boeckh et al. | 524/549 X |
| 4,980,412 | 12/1990 | Blum | 524/549 X |
| 5,025,043 | 1/1991 | Smith | 524/607 X |
| 5,026,755 | 6/1991 | Kreglis et al. | 524/514 X |
| 5,109,054 | 4/1992 | Smith | 524/607 X |

FOREIGN PATENT DOCUMENTS

| | | | |
|---|---|---|---|
| 2022873 | 1/1987 | Japan | 524/549 |
| 7513983 | 6/1977 | Netherlands | 524/549 |
| 1032363 | 9/1962 | United Kingdom . | |

*Primary Examiner*—Joseph L. Schofer
*Assistant Examiner*—J. M. Reddick
*Attorney, Agent, or Firm*—Daniel B. Reece, IV; Terry B. McDaniel; Richard L. Schmalz

[57] ABSTRACT

The invention is pigment grinding aids for water-based inks which are produced by reacting an unsaturated fatty acid and/or resin acid with either acrylic acid, metacrylic acid, fumaric acid, or maleic anhydride to form a polycarboxylic acid anhydride. The polycarboxylic acid anhydride is reacted with an excess of polyamine to produce an amidoamine or imidoamide intermediate. This intermediate is reacted with either acrylic acid or methacrylic acid to produce the grinding aid.

10 Claims, No Drawings

ROSIN AND FATTY ACID BASED PIGMENT GRINDING AIDS FOR WATER-BASED INK FORMULATIONS

FIELD OF INVENTION

This invention relates to novel compositions of matter for ink pigment grinding aids and the process for preparing them. In particular, this invention relates to novel compositions of matter which allow high solids pigment dispersions to be obtained for water-based ink formulations while maintaining excellent physical properties in the finished inks.

BACKGROUND OF THE INVENTION

Impelled by environmental concerns and increasing governmental regulations on the volatile organic content of inks and coatings, the applications of water-based flexographic and rotogravure inks are increasing in the ink industry. A typical water-based ink system is formulated by the addition of a binder resin (usually acrylic polymer latices) to a grind base. Grind bases are prepared by grinding pigments with alkali soluble grind resins (such as low molecular weight rosin-based resins or acrylic resins) until submicron particle size dispersions are obtained.

The use of wetting agents (i.e. grinding aids) help maximize mill-throughput by reducing grind times while also improving the gloss, stability, and color strength of pigment dispersions. High color strength allows dilution of finished inks to lower pigment levels. As pigment expense usually constitutes about two-thirds of the total cost of an ink, color strength remains a primary consideration for ink formulators.

An ink formulator must also consider the compatibility of the various ink components when selecting the grind resins or grinding aids to be used. Grind bases (i.e. pigment dispersions) are let-down with a variety of alkali-soluble resins or alkali-insoluble resin emulsions to achieve the properties desired for the end use of the ink. As wetting agents tend to be selective with pigments and ink types, often the grind resins and the let-down resins are not compatible. This incompatibility can result in pigment flocculation and flotation, viscosity increase, loss of adhesion and color strength, and other problems.

To minimize these problems "resinless" high solids pigment dispersions prepared with 5-10% dispersant are used in many cases. Pigments are ground with a low dosage of surfactant blends often referred to as "universal pigment dispersants." However, pigments such as titanium oxide, carbon black, and certain organic pigments have hydrophilic/lipophilic balance (HLB) values between 8 and 16; hence no one compound can give optimum performance. Therefore, blends are generally formulated to cover the whole HLB range in question.

Grinding aids which form high solids pigment dispersions help reduce shipping costs. The high solid pigment grinds are transported to the various ink formulators where the grinds are let-down into inks. At the press-site the inks are diluted to the needed press-ready viscosities and color strengths.

Therefore, it is the object of this invention to have a versatile pigment grinding aid for water-based ink formulations which allow high solids pigment dispersions to be obtained while maintaining excellent physical properties in the finished inks.

SUMMARY OF THE INVENTION

The object of this invention is met by reacting an unsaturated fatty acid and/or resin acid with either acrylic acid, methacrylic acid, fumaric acid, or maleic anhydride to produce a polycarboxylic acid anhydride. The polycarboxylic acid anhydride is reacted with an excess of polyamine to produce an amidoamide or imidoamide intermediate. This intermediate is reacted with either acrylic acid or methacrylic acid to produce the grinding aid.

The ratio of unsaturated fatty acid and/or resin acid to acrylic acid, metacrylic acid, fumaric acid, or maleic anhdride required to produce the desired polycarbolylic acid anhydride ranges from 100:5 to 100:30. The ratio of polycarboxylic acid anhydride to polyamine required to produce the desired amidoamide or imidoamide intermediate ranges from 1:1 to 2.5:1. The ratio of amidoamide or imidoamide intermediate to acrylic acid or methacrylic acid required to produce the invention grinding aid ranges from 100:10 to 100:30.

It has been found that modified reaction products of polyamines with certain dicarboxylic and tricarboxylic acid anhydrides are extremely efficient grinding aids. Pigments have been ground at 30-50% loading at a pigment to grinding aid ratio of 5:1 to 10:1. Water or a mixture of water, isopropanol, and a suitable amine (such as monoethanolamine) for pH adjustment was used to produce grind bases which exhibited excellent color strength and good compatibility with acrylic emulsions and lignin dispersions.

Additionally, the unique chemistry of the grinding aids allows one to cover a wide range of HLB-values by varying the ratios of reactants or the pH of the reaction during production. This versatility will serve ink formulators in their task of assuring compatibility between ink components.

DESCRIPTION OF THE PREFERRED EMBODIMENT

The polycarboxylic acids and anhydrides used in the preparation of the invention grinding aids are represented by the following formulae:

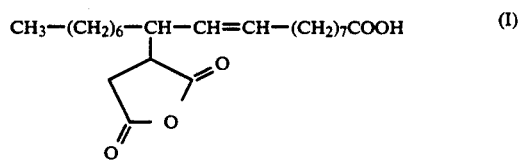

(I)

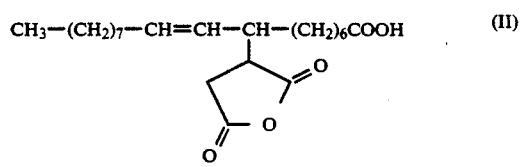

(II)

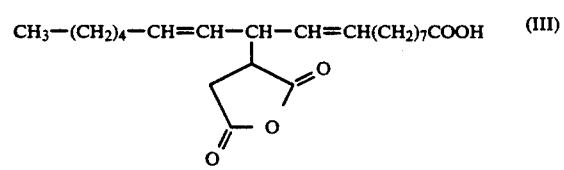

(III)

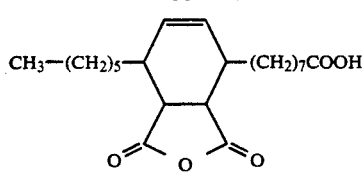

(IV)

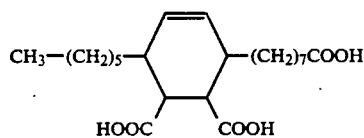

(V)

$C_{22}$-tricarboxylic acid anhydrides I and II are isomers and are obtained by the reaction of oleic acid or elaidic acid with maleic anhydride at temperature of 180° C. and above. Anhydride II is the mono adduct of maleic anhydride and linoleic acid. Because of the two double bonds a second mole of maleic anhydride can be added resulting in a pentacarboxylic acid dianhydride. Formulae I, II, and III are the major reaction products derived from tall oil fatty acid and maleic anhydride as described by Riedeman and Lupichuk in U.S. Pat. No. 3,451,958. Anhydride IV is obtained when linoleic acid is catalytically isomerized to conjugated linoleic acid prior to the reaction with maleic anhydride. Via a Diels-Alder cycloaddition, a cyclohexene tricarboxylic acid anhydride is obtained. The preparation of this type of cycloaliphatic acid anhydride from conjugated linoleic acid and maleic anhydride is disclosed by Crawford in British Pat. No. 1,032,363 and U.S. Pat. No. 3,412,056. Since tall oil fatty acid consists of approximately 50% oleic acid and 50% linoleic acid, the maleic anhydride addition in the presence of iodine will give a mixture of cyclic (IV) and open (I, II) $C_{22}$-tricarboxylic acid anhydrides. Formula V is the fumaric Diels-Alder adduct obtained from conjugated linoleic acid.

When the polycarboxylic acid anhydrides are heated with a polyamine, a variety of reaction products (i.e. amidoamides and imidoamides) can be obtained. An extensive review of the chemistry of this reaction is contained in commonly assigned U.S. Pat. No. 4,494,992 to Schilling et.al., which is hereby incorporated by reference.

The products of the above reactions are reacted with acrylic acid or methacrylic acid to produce the invention grinding aid. This carboxyalkylation reaction is taught in commonly assigned U.S. Pat. No. 4,478,642 to Schilling et. al., which is hereby incorporated by reference. Further reviews of the chemistry of these reactions are contained in commonly assigned U.S. Pat. Nos. 4,547,224 to Schilling and 4,561,901 to Schilling, which are hereby incorporated by reference.

Unsaturated fatty acids which are suitable for use in the reaction include, but are not limited to, the following:
tall oil
soybean oil
tung oil
linseed oil
linoleic acid
linolenic acid
oleic acid.

Resin acids which are suitable for use in the reaction include, but are not limited to, the following:

tall oil resin
wood resin.

Reactants which are suitable for use in the Diels-Alder or the "ene"-cyclocondensation reaction with the above fatty acids and/or resin acids include, but are not limited to, the following:
acrylic acid
methacrylic acid
fumaric acid
maleic anhydride.

Polyamines which are suitable for use in the reaction include, but are not limited to, the following:
aminoethylethanolamine
aminoethylpiperazine
diethylenetriamine
triethylenetetramine
tetraethylenepentamine
bis-aminopropylamine
pentamethylenediamine Amine HH (a polyamine blend manufactured by Union Carbide) is composed of the following major ingredients:

| | |
|---|---|
| aminoethylpiperazine: | 55.1–63.0% |
| triethylenetetramine: | 25.8–35.8% |
| aminoethylethanolamine: | 5.6–9.3% |
| diethylenetriamine: | 6.9–5.1% |
| hydroxyethylpiperazine: | 1.3–3.1% |

Reactants which are suitable for use in the carboxyalkylation reaction with the amidoamides or the imidoamides include, but are not limited to, the following:
acrylic acid
methacrylic acid.

The grind bases and inks produced from the invention grinding aid are suitable for use within the pH range of 3 to 10.

As appreciated in the art, the exact components and properties of components desired for any given ink application can vary, and, therefore, routine experimentation may be required to determine the optional components and proportions of components for a given application and desired properties.

The following examples are provided to further illustrate the present invention and are not to be construed as limiting the invention in any manner.

EXAMPLE 1

A preferred grinding aid (wetting agent) for pigments used in water-based printing inks is produced by the following procedure. All reactants are measured in parts by weight.

Twenty (20) parts maleic anhydride are reacted with 100 parts tall oil fatty acid/rosin blend (80:20) at 205°–210–° C. for five hours. One hundred (100) parts of the resulting adduct is heated to 150° C. Over a period of 30 minutes 65 parts of Amine HH is slowly added to the adduct, and heated to 240° C. (until all the water of condensation is removed). After cooling to 90° C., the resulting amine condensate is diluted with water to 50% activity. Two hundred (200) parts of this solution are reacted with 15.7 parts acrylic acid at 90° C. for three hours and diluted with 15.7 parts water to the final activity of 50% NV (non-volatile). For final pH adjustment, the desired amount of $NH_2$ or an amine is used. Finally, 1.16 parts of defoamer DF-75 (manufactured by Air Products) or Foamburst 51 (manufactured by Ross Chemicals) is added to the finished product. This product is hereafter referred to as GA-1.

Chemically, GA-1 resembles an amphoteric amino acid. Thus, depending on the pH value of the varnish, it can be used either as a cationic or an anionic wetting agent. At the isoelectric point (where numbers of positive charges equal the number of negative charges), the product is somewhat less effective as a dispersant.

At the present time, the use of GA-1 at high pH values is important since water-based printing inks are currently produced at a pH range of 8 to 10. However, due to increasing environmental controls on the amines used in water-based printing inks, slightly acidic pH values might be an option in the future.

Accordingly, a series of grind bases of 40% phthalocyanine blue concentrates using 6.5% GA-1 were prepared from varnishes (i.e., alkaline solutions of the resins) having different pH values. As can be seen from Table I below, fluid grinds were obtained when the pH value of the varnish was above 7.5 and below 6.5. In the neutral (isoelectric) range, the grinds were pasty and did not flow.

TABLE I

Properties Of Phthalocyanine Concentrates Prepared With GA-1 At Different pH Values

| pH Value | Viscosity$^a$ | | Gloss-Value$^b$ | Color Strength$^c$ | | |
|---|---|---|---|---|---|---|
| | S-3 | Z-2 | | DL | DA | DB |
| 4.49 | 9.5 | 16.9 | 3.3 | 26.79 | 18.57 | −31.96 |
| 4.97 | 9.8 | 16.9 | 3.4 | 27.61 | 19.94 | −33.46 |
| 5.35 | 9.4 | 16.9 | 3.5 | 26.54 | 18.74 | −32.07 |
| 5.85 | 10.1 | 17.0 | 3.9 | 26.08 | 19.58 | −32.81 |
| 5.95 | 13.7 | 18.5 | 3.5 | 25.46 | 20.35 | −32.23 |
| 6.60 | No Flow | | 2.6 | 23.69 | 21.09 | −31.05 |
| 7.20 | No Flow | | 2.2 | 23.00 | 21.55 | −30.30 |
| 7.55 | 39.5 | 41.3 | 3.5 | 25.37 | 20.31 | −31.57 |
| 7.65 | 11.5 | 17.5 | 2.8 | 27.83 | 16.17 | −31.29 |
| 8.42 | 9.7 | 17.0 | 3.5 | 28.88 | 15.95 | −30.71 |
| 8.92 | 9.3 | 16.9 | 3.7 | 29.11 | 15.82 | −31.86 |
| 9.25 | 9.8 | 17.0 | 3.3 | 28.75 | 16.72 | −31.17 |
| 9.73 | 10.3 | 17.2 | 3.4 | 28.83 | 16.08 | −31.30 |

$^a$S-3: Shell cup #3. Z-2: Zahn cup #2. Viscosity is measured in seconds.
$^b$The draw-downs were prepared with a #2 Meyer rod on uncoated paper for gloss measurements.
$^c$Determined with a MacBeth Color Eye from draw-downs of grind bases (diluted 1:1 with water) against black tile as the reference.
DL: Lower number indicates darker drawdown.
DA: Higher number indicates redder draw-down.
DB: Higher negative number indicates bluer draw-down.

As the results in Table I show, the best color strengths were obtained from concentrates prepared at close to neutral pH values.

Full strength inks were prepared by letting-down the above grind bases with JONCRYL® J-134 (JONCRYL J-134 is an acrylic emulsion manufactured by S. C. Johnson & Sons, Inc.) in the following amounts: 22.5 parts (by weight) of grind base, 20 parts JONCRYL J-134 (pH 8.3), 6 parts water, and 1.5 parts JONWAX® 26 (JONWAX 26 is a polyethylene wax emulsion manufactured by S. C. Johnson & Sons, Inc.). The let-down inks were tested and the properties recorded below.

TABLE II

Properties of Inks Prepared with JONCRYL J-134 and GA-1

| pH Value | | Viscosity$^a$ | | 60° Gloss$^b$ | Color Strength$^c$ | | |
|---|---|---|---|---|---|---|---|
| Grind | Ink | S-3 | Z-2 | | DL | DA | DB |
| 4.49 | 7.52 | 10.3 | 16.2 | 4.6 | 24.28 | 6.33 | −34.87 |
| 4.97 | 8.24 | 10.5 | 16.2 | 4.7 | 24.52 | 7.12 | −31.75 |
| 5.35 | 8.25 | 10.1 | 16.4 | 4.7 | 25.31 | 6.18 | −32.42 |
| 5.85 | 8.27 | 12.0 | 16.7 | 4.6 | 24.80 | 6.80 | −31.46 |
| 5.95 | 8.26 | 11.2 | 16.6 | 4.6 | 26.62 | 5.86 | −32.79 |
| 6.60 | 8.28 | 14.0 | 17.4 | 4.0 | 26.08 | 6.84 | −33.00 |
| 7.20 | 8.30 | 17.0 | 19.0 | 3.8 | 26.19 | 7.05 | −33.46 |
| 7.55 | 8.61 | 15.4 | 18.5 | 5.3 | 25.55 | 6.73 | −33.15 |
| 8.42 | 8.69 | 20.2 | 19.9 | 4.6 | 25.70 | 7.18 | −33.26 |
| 8.92 | 8.79 | 20.5 | 19.8 | 5.0 | 24.46 | 8.64 | −32.05 |
| 9.25 | 8.90 | 22.5 | 21.6 | 5.5 | 25.31 | 8.12 | −33.16 |
| 9.73 | 9.08 | 29.1 | 26.9 | 6.3 | 24.95 | 9.08 | −32.49 |

$^a$S-3: Shell cup #3. Z-2: Zahn cup #2. Viscosity is measured in seconds.
$^b$The draw-downs were prepared with a #2 Meyer rod on uncoated paper for gloss measurements.
$^c$Determined with a MacBeth Color Eye from draw-downs of grind bases (diluted 1:1 with water) against black tile as the reference.
DL: Lower number indicates darker drawdown.
DA: Higher number indicates redder draw-down.
DB: Higher negative number indicates bluer draw-down.

The pH values of the inks ranged between 7.50 and 9.10. Viscosities, gloss, and color strength depended on the pH value of the grind concentrate. It appears that the gloss of the grind base (which recorded a minimum at pH 7.20) determines the gloss of the ink, since in the buffered region at the same pH value, different gloss values were obtained. On the other hand, the color strength of the inks were better at the lower and higher pH values. Due to the higher viscosities present at higher pH values, there is more ink on the surface of the paper giving the impression of a higher color value. Thus, "true" darker inks were obtained at the lower pH values (7.5 to 8.25).

The viscosities of the inks were influenced by the pH value to a much greater extent. At high pH values, the ink efflux times were 1.6 times (Z-2) and 2.9 times (S-3) greater than that of the low pH inks. This is important since inks with press-ready viscosities can be prepared with less acrylic resin when the pH is kept around 9.0.

EXAMPLE 2

A comparison of the pigment dispersing ability of GA-1 was conducted with an industry standard, JONCRYL 678 (JONCRYL 678 is an acrylic resin grinding aid manufactured by S. C. Johnson & Sons, Inc.). The GA-1 was manufactured via the method taught in Example 1 on pages 8 and 9. All subsequent formulations are given in parts per 100 by weight.

Two series of different color grind bases were produced (one using GA-1 as the grinding aid, the other JONCRYL 678) utilizing the following formulations:

| | |
|---|---|
| 70.0 | Presscake at 50% NV (non-volatile) |
| 10.1 | JONCRYL 678 |
| 1.0 | Foamburst 51 |
| 2.0 | Ammonium Hydroxide |
| 16.9 | Water |
| 100.0 | | and

| | |
|---|---|
| 70.0 | Presscake at 50% NV |
| 20.3 | GA-1 |
| 1.0 | Foamburst 51 |
| 1.0 | Ammonium Hydroxide |
| 7.7 | Water |
| 100.0 | |

Foamburst 51 is a defoamer manufactured by Ross Chemicals. The following high solids presscakes manufactured by Sun Chemicals were used in the above formulations:

| | |
|---|---|
| #449-5050 | Green Shade Phthalo Blue |
| #474-5074 | AAOT Yellow |
| #419-5092 | Rubine. |

In addition to the above colors, Vulkan K (a carbon black manufactured by Cabot Chemicals) was used for black in the following formulations:

| | |
|---|---|
| 35.0 | Vulkan K |
| 7.0 | JONCRYL 678 |
| 1.0 | Foamburst 51 |
| 1.5 | Ammonium Hydroxide |
| 55.5 | Water |
| 100.0 | | and

| | |
|---|---|
| 35.0 | Vulkan K |
| 14.0 | GA-1 |
| 1.0 | Foamburst 51 |
| 1.0 | Ammonium Hydroxide |
| 55.5 | Water |
| 100.0 | |

Differences in the color development obtained after grinding are difficult to measure directly from the grind base, therefore the bleach out technique is employed to test the strength of pigment dispersions. In the bleach out technique, the grind base is added to a white grind (bleach) which dilutes the intense absorption of the colored grind base. A print of the bleached grind base is made along side that of one prepared using a standard resin. In this study, the technique was performed using the following formulation as the bleach base:

| | |
|---|---|
| 62.5 | RHD6X TiO$_2$ |
| 7.0 | JONCRYL 67 |
| 6.0 | Isopropanol |
| 3.0 | Ammonium Hydroxide |
| 21.5 | Water |
| 100.0 | |

RHD6X TiO$_2$ is titanium dioxide manufactured by Tioxide, Incorporated. JONCRYL 67 is an acrylic resin manufactured by S. C. Johnson & Sons, Inc.

The pigment base was diluted by mixing (not grinding) with a much larger quantity of the opaque white bleach base, so as to eliminate any minor differences of gloss and hue. In each of these comparisons, 4g of a pigment grind base (formulated as shown above) were mixed with 4g of water and 32g of the above bleach base. The results are listed in Table III below.

TABLE III

| | Bleach Test[1] | | | |
|---|---|---|---|---|
| | J-678 | | GA-1 | |
| | Density[2] | Gloss[3] | Density[2] | Gloss[3] |
| Yellow | 0.66 | 60.2 | 0.66 | 63.1 |
| Rubine | 0.81 | 56.5 | 0.82 | 57.3 |
| Blue | 1.11 | 58.9 | 1.11 | 60.5 |
| Black | 0.95 | 68.7 | 0.95 | 67.1 |

[1] Printed with #7 meyer bar on Printkote ® Board.
[2] Cosar Pressmate 102 Densitometer used.
[3] Gloss Guard II Glossmeter, 60°.

These results show that GA-1 compares favorably with JONCRYL 678 as a pigment dispersing resin.

Inks were prepared from each of the eight bases via the formulation shown below; and the gloss, color, density, viscosity, and pH of the resulting inks were measured. Prints were made with full strength inks using a #7 meyer bar.

| Ink Formulations: | |
|---|---|
| 40 | Base |
| 40 | JONCRYL 134 |
| 17 | Water |
| 3 | JONWAX 26 |
| 100 | |

TABLE IV

| | Ink Results[1] | | | |
|---|---|---|---|---|
| | J-678 | | GA-1 | |
| | Density[2] | Gloss[3] | Density[2] | Gloss[3] |
| Yellow | 1.47 | 41.0 | 1.44 | 45.9 |
| Rubine | 2.12 | 43.7 | 2.14 | 45.9 |
| Blue | 2.53 | 34.9 | 2.88 | 43.9 |
| Black | 2.49 | 49.5 | 2.52 | 53.6 |

[1] Printed with #7 meyer bar on Printkote ® Board.
[2] Cosar Pressmate 102 Densitometer used.
[3] Gloss Guard II Glossmeter, 60°.

These results show the resins exhibiting almost equal color strengths with GA-1 having a consistent gloss advantage over JONCRYL 678.

In summary, GA-1 is an excellent pigment dispersant. Its performance was equal to or better than JONCRYL 678 in the dispersion of phthalo blue, AAOT yellow, lithol rubine, and black. Bleach tests on bases prepared from these two products show GA-1 to have equal color strength in all cases.

The bases were then letdown into inks with JONCRYL J-134 as the sole letdown vehicle. GA-1 was shown to have equal color strength with, and a consistent gloss advantage over, JONCRYL 678.

EXAMPLE 3

A series of wetting agents were produced wherein the rosin content of the grind bases were varied. Since the intermediate amidoamine of fortified rosin cannot be diluted with water (due to its high melting point) a different method than the one taught above had to be taken to prepare the wetting agents. To 153.7g fortified rosin, prepared by reacting 100 parts water with 20 parts maleic anhydride at 200° C., 153.7g dipropylene glycol is added and heated to 100° C. At this time 100 g of Amine HH is added and heated to 240° C. until all the water of reaction is removed. It is cooled to 90° C. and diluted with water to 50% solids (based on the amido amine). At 70° C. 22 g acrylic acid and 22 ml water is added and kept at 85° C. for eight hours. These grind bases were tested and their properties recorded below.

TABLE V

| Properties of Grind Bases With Varying Rosin Contents | | | | | | | |
|---|---|---|---|---|---|---|---|
| % Rosin | Conc. | pH | 60° | Visc | Color Strength | | |
| Content | %[a] | Value | Gloss | (S)[b] | DL | DA | DB |
| 15 | 4.5 | 7.72 | 3.3 | 9.4 | 28.04 | 16.67 | −32.07 |
| 15 | 6.0 | 8.00 | 3.3 | 10.9 | 29.82 | 15.81 | −30.11 |
| 20 | 4.5 | 7.79 | 3.2 | 18.2 | 27.06 | 18.05 | −31.49 |
| 20 | 6.0 | 7.81 | 3.5 | 7.8 | 29.27 | 14.16 | −31.50 |
| 25 | 4.5 | 7.82 | 2.8 | 10.0 | 27.69 | 16.19 | −32.12 |
| 25 | 6.0 | 7.93 | 2.8 | 7.8 | 29.95 | 13.45 | −32.45 |
| 30 | 4.5 | 7.75 | 3.0 | 11.7 | 26.39 | 17.72 | −32.15 |
| 30 | 6.0 | 7.65 | 2.7 | 12.3 | 26.95 | 17.65 | −31.14 |
| 35 | 4.5 | 8.00 | 3.1 | 12.1 | 26.82 | 16.82 | −32.66 |
| 35 | 6.0 | 7.58 | 3.4 | 10.4 | 28.22 | 16.95 | −29.10 |
| 40 | 4.5 | 7.75 | 2.5 | 16.2 | 25.46 | 17.17 | −34.01 |
| 40 | 6.0 | 7.64 | 2.3 | 11.4 | 27.82 | 15.71 | −30.49 |

TABLE V-continued

Properties of Grind Bases With Varying Rosin Contents

| % Rosin Content | Conc. %[a] | pH Value | 60° Gloss | Visc (S)[b] | Color Strength DL | DA | DB |
|---|---|---|---|---|---|---|---|
| 50 | 4.5 | 7.58 | 3.1 | 14.7 | 25.93 | 17.50 | −32.66 |
| 50 | 6.0 | 7.46 | 2.2 | 13.3 | 28.19 | 14.42 | −32.42 |
| 75 | 4.5 | 7.84 | 2.4 | 32.9 | 23.95 | 17.75 | −33.57 |
| 75 | 6.0 | 8.12 | 2.7 | 11.1 | 27.42 | 15.34 | −31.52 |
| 100 | 4.5 | 8.12 | 1.2 | NF | 22.80 | 17.40 | −35.58 |
| 100 | 6.0 | 8.40 | 1.2 | NF | 23.17 | 16.76 | −34.71 |

[a]Concentration of grinding aid (wetting agent).
[b]Viscosity was measured is seconds via a Shell cup #3. NF: No Flow.
[c]Diluted to 20% pigment content with water.

Table V shows the properties of the grind bases derived from various rosin blends and from 100% rosin as a starting material. At 4.5% concentration of the wetting agent, the products from blends containing 20–50% rosin gave storage stable grind bases, whereas products prepared from blends with higher rosin contents tended to gel. Increasing the content of wetting agent to 6% gave stable grind bases with lower viscosities when grinding aids prepared with up to 75% rosin content in the starting material were used. The rosin-based wetting agent gave a high viscosity grind base.

Grinds prepared with wetting agents containing a high amount of the rosin component gave darker grinds.

EXAMPLE 4

A preferred grinding aid for pigments used in water-based printing inks is produced by the following procedure. All reactants are measured in parts by weight.

One hundred (100) parts of L-5 (L-5 is a tall oil derived fatty acid containing about 5% rosin, manufactured by Westvaco) are reacted with 16.8 parts fumaric acid at 200°–220° C. for 2 to 3 hours. On hundred (100) parts of the resulting adduct is heated to 50° C. Over a period of 30 minutes, 50 parts of Amine HH is slowly added to the adduct, causing the temperature to rise to about 120° C. It is heated to 220°–230° C. until all the water of condensation has been collected. After cooling to 80° C., the resulting amine condensate is diluted with water to 50% activity. Two hundred (200) parts of this solution are reacted with 15 parts acrylic acid at 70° C. for 3 hours and diluted with 15 parts water to the final activity of 50% NV. For final pH adjustment, the desired amount of NH$_3$ or an amine is used. Finally, 1.16 parts of Foamblast 51 is added to the finished product. This finished product is hereafter referred to as GA-2.

This wetting aid (GA-2) has all the good properties found in GA-1, but is lower in color. As GA-2 is produced at a pH of 7.0 to 7.5, the ink formulator will have the flexibility of adjusting the pH with an amine of his choice.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A grinding base comprising ink pigments dispersed in a solution having a pH between 3 and 10 with a pigment grinding aid, said pigment grinding aid prepared by the steps comprising:
   (a) reacting 100 parts be weight of a member selected from the group consisting of an unsaturated fatty acid, a resin acid, and a combination thereof with 5 to 30 parts by weight of a member selected from the group consisting of acrylic acid, methacrylic acid, fumaric acid, maleic anhydride, and a combination thereof, in an "ene"-cyclocondensation reaction to form a polycarboxylic acid anhydride;
   (b) reacting 1 to 2.5 parts by weight of said polycarboxylic acid anhydride with 1 part by weight of polyamine to form an amidoamide or imidoamide reaction product; and
   (c) reacting 100 parts by weight of said reaction product with 10 to 30 parts by weight of a member selected from the group consisting of acrylic acid and methacrylic acid.

2. The grinding base of claim 1 wherein the unsaturated fatty acid is selected from the group consisting of tall oil, soybean oil, tung oil, linseed oil, linoleic acid, linolenic acid, oleic acid, and a combination thereof.

3. The grinding base of claim 1 wherein the resin acid is selected from the group consisting of tall oil resin, wood resin, and a combination thereof.

4. The grinding base of claim 1 wherein the polyamine is selected from the group consisting of aminoethylethanolamine, aminoethylpiperazine, diethylenetriamine, triethylenetetramine, tetraethylenepentamine, bis-aminopropylamine, pentamethylenediamine, and a combination thereof.

5. A water-based ink comprising the grinding base of claim 1 let down in a binder resin emulsion having a pH between 3 and 10.

6. A grinding base comprising ink pigments dispersed in a solution having a pH between 3 and 10 with a pigment grinding aid, said pigment grinding aid prepared by the steps comprising:
   (a) reacting 100 parts of weight of a member selected from the group consisting of an unsaturated fatty acid, a resin acid, and a combination thereof with 5 to 30 parts by weight of a member selected from the group consisting of acrylic acid, methacrylic acid, fumaric acid, maleic anhydride, and a combination thereof, in a Diels-Alder reaction to form a polycarboxylic acid anhydride;
   (b) reacting 1 to 2.5 parts by weight of said polycarboxylic acid anhydride with 1 part by weight of polyamine to form an amidoamide or imidoamide reaction product; and
   (c) reacting 100 parts by weight of said reaction product with 10 to 30 parts by weight of a member selected from the group consisting of acrylic acid and methacrylic acid.

7. The grinding base of claim 6 wherein the unsaturated fatty acid is selected from the group consisting of tall oil, soybean oil, tung oil, linseed oil, linoleic acid, linolenic acid, oleic acid, and a combination thereof.

8. The grinding base of claim 6 wherein the resin acid is selected from the group consisting of tall oil resin, wood resin, and a combination thereof.

9. The grinding base of claim 6 wherein the polyamine is selected from the group consisting of aminoethylethanolamine, aminoethylpiperazine, diethylenetriamine, triethylenetetramine, tetraethylenepentamine, bis-aminopropylamine, pentamethylenediame, and a combination thereof.

10. A water-based ink comprising the grinding base of claim 6 let down in a binder resin emulsion having a pH between 3 and 10.

* * * * *

UNITED STATES PATENT AND TRADEMARK OFFICE
CERTIFICATE OF CORRECTION

PATENT NO.  : 5,182,326
DATED       : January 26, 1993
INVENTOR(S) : Paul J. LeBlanc et al.

It is certified that errors appear in the above-identified patent and that said Letters Patent is hereby corrected as shown below:

In column 4, line 19, after pentamethylenediamine, insert --Amine HH--.

In column 4, line 57, delete "210-°C" and substitute therefor --210°C--.

In column 4, line 67, delete "$NH_2$" and substitute therefor --$NH_3$--.

In Claim 1, column 9, line 66, delete "be" and substitute therefor --by--.

Signed and Sealed this

Second Day of November, 1993

BRUCE LEHMAN

*Attest:*

*Attesting Officer*        *Commissioner of Patents and Trademarks*